(12) United States Patent
Lo et al.

(10) Patent No.: US 12,539,021 B2
(45) Date of Patent: Feb. 3, 2026

(54) DAMPING-ENABLED ENDOSCOPE OPERATOR

(71) Applicant: MEDICAL INTUBATION TECHNOLOGY CORPORATION, Taoyuan (TW)

(72) Inventors: Shih-Wei Lo, Taoyuan (TW); Chun-Yi Kuo, Taoyuan (TW)

(73) Assignee: MEDICAL INTUBATION TECHNOLOGY CORPORATION, Taoyuan (TW)

( * ) Notice: Subject to any disclaimer, the term of this patent is extended or adjusted under 35 U.S.C. 154(b) by 210 days.

(21) Appl. No.: 18/591,428

(22) Filed: Feb. 29, 2024

(65) Prior Publication Data
US 2025/0049308 A1    Feb. 13, 2025

(30) Foreign Application Priority Data
Aug. 7, 2023    (TW) .................................. 112129569

(51) Int. Cl.
*A61B 1/005* (2006.01)
*A61B 1/00* (2006.01)

(52) U.S. Cl.
CPC ........ *A61B 1/0052* (2013.01); *A61B 1/00042* (2022.02); *A61B 1/00147* (2013.01); *A61B 1/0057* (2013.01)

(58) Field of Classification Search
CPC . A61B 1/0052; A61B 1/00042; A61B 1/0057; A61B 1/00147
See application file for complete search history.

(56) References Cited

U.S. PATENT DOCUMENTS

| | | | | |
|---|---|---|---|---|
| 8,784,299 B2* | 7/2014 | Takemoto | ................. | A61B 1/00 604/95.04 |
| 9,968,241 B2* | 5/2018 | Iuel | ...................... | A61B 1/0051 |
| 10,004,384 B2* | 6/2018 | Oginski | ............. | A61B 1/00128 |
| 2008/0139886 A1* | 6/2008 | Tatsuyama | ........... | A61B 1/0055 600/146 |
| 2013/0102846 A1* | 4/2013 | Sjostrom | .............. | A61B 1/0052 600/110 |

FOREIGN PATENT DOCUMENTS

TW    I745733    11/2021

* cited by examiner

*Primary Examiner* — Colin T. Sakamoto
(74) *Attorney, Agent, or Firm* — MUNCY, GEISSLER, OLDS & LOWE, P.C.

(57) ABSTRACT

A damping-enabled endoscope operator includes: a bottom rod having a top end provided with a sphere; a plate having a penetrating hole penetrable by the bottom rod, with the penetrating hole being of a small diameter than the sphere; a body fixedly disposed at the plate, covering the sphere, having an installation channel penetrating the body vertically, and allowing a portion of the sphere to protrude into the installation channel; a damper for abutting against the sphere; and an operating rod movably vertically disposed at the body and having a bottom end adapted to press against or separate from the damper during the vertical movement of the operating rod. A positioning mechanism is disposed between the operating rod and the body and adapted to enable the operating rod to be positioned in place upon completion of the vertical movement thereof.

9 Claims, 10 Drawing Sheets

DAMPING-ENABLED ENDOSCOPE OPERATOR

BACKGROUND OF THE INVENTION

1. Field of the Invention

The present disclosure relates to swing operators of endoscopes, and more particularly to a damping-enabled endoscope operator.

2. Description of Related Art

Taiwan invention U.S. Pat. No. 1,745,733, owned by the applicant of the disclosure, discloses an endoscope joystick structure capable of damping, comprising a lower annular plate for pressing against a driven annular plate to effectuate damping between the driven annular plate and the top surface of a body. The joystick passes through a round hole centrally disposed at the driven annular plate to allow the joystick being manipulated and swung to drive the movement of the driven annular plate. Thus, the manipulation of the joystick is subjected to resistance in the course of the movement of the driven annular plate in the presence of damping, thereby providing damping to the joystick.

Although the prior art is effective in providing or not providing damping to the joystick, a gap inevitably exists between the joystick and the driven annular plate, because the joystick passes through the round hole of the driven annular plate and is manipulated to control the movement of the driven annular plate. Furthermore, it is the driven annular plate, instead of the joystick, which is subjected to damping. As a result, even though the driven annular plate is subjected to damping, the gap still provides a little room for vibration of the joystick. Therefore, the prior art still has room for improvement.

BRIEF SUMMARY OF THE INVENTION

It is an objective of the disclosure to provide a damping-enabled endoscope operator capable of directly providing damping to an operating rod in operation to preclude instability, such as vibration, of the operating rod in a damping-enabled state.

To achieve the above and other objectives, the disclosure provides a damping-enabled endoscope operator, adapted to be disposed on an endoscope unit, the damping-enabled endoscope operator comprising: a bottom rod fixedly disposed at the endoscope unit and having a top end provided with a sphere; a plate having a penetrating hole penetrable by the bottom rod, with the penetrating hole being of a small diameter than the sphere; a body fixedly disposed at the plate and adapted to cover the sphere to rotatably clamp the sphere between the plate and the body, the body having an installation channel penetrating the body vertically, wherein a bottom end of the installation channel is of a smaller diameter than the sphere, and a portion of the sphere protrudes into the installation channel; a damper disposed in the installation channel and having a bottom abutting against the sphere; and an operating rod movably vertically disposed at the body, partially protruding into the installation channel, and having a bottom end adapted to press against or separate from the damper during the vertical movement of the operating rod, wherein a positioning mechanism is disposed between the operating rod and the body and adapted to enable the operating rod to be positioned in place upon completion of the vertical movement thereof, wherein one of the body and the plate has a plurality of cable holders equiangularly spaced apart from one another relative to the installation channel and adapted to fix cables in place for insertion into the endoscope unit.

Owing to its aforesaid technical features, the disclosure is effective in using a damper to directly act on a sphere to effectuate damping and thus directly act on an operating rod, precluding instability, such as vibration, of the operating rod in a damping-enabled state.

DETAILED DESCRIPTION OF THE INVENTION

The technical features of the disclosure are herein illustrated with preferred embodiments, depicted with drawings, and described below.

Figure 4:
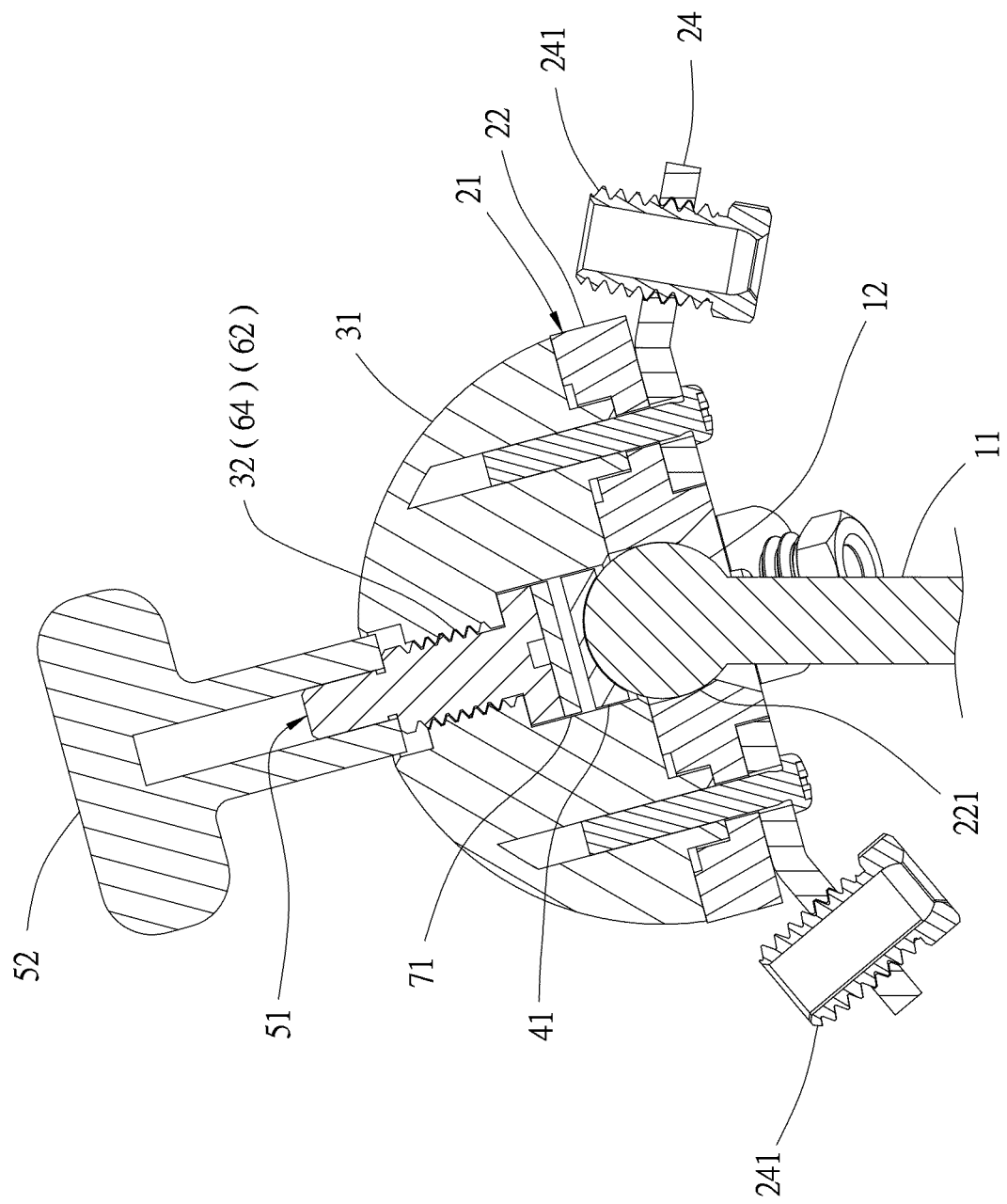
FIG. 4 is a first operational schematic view of the first preferred embodiment of the disclosure.
Figure 5:
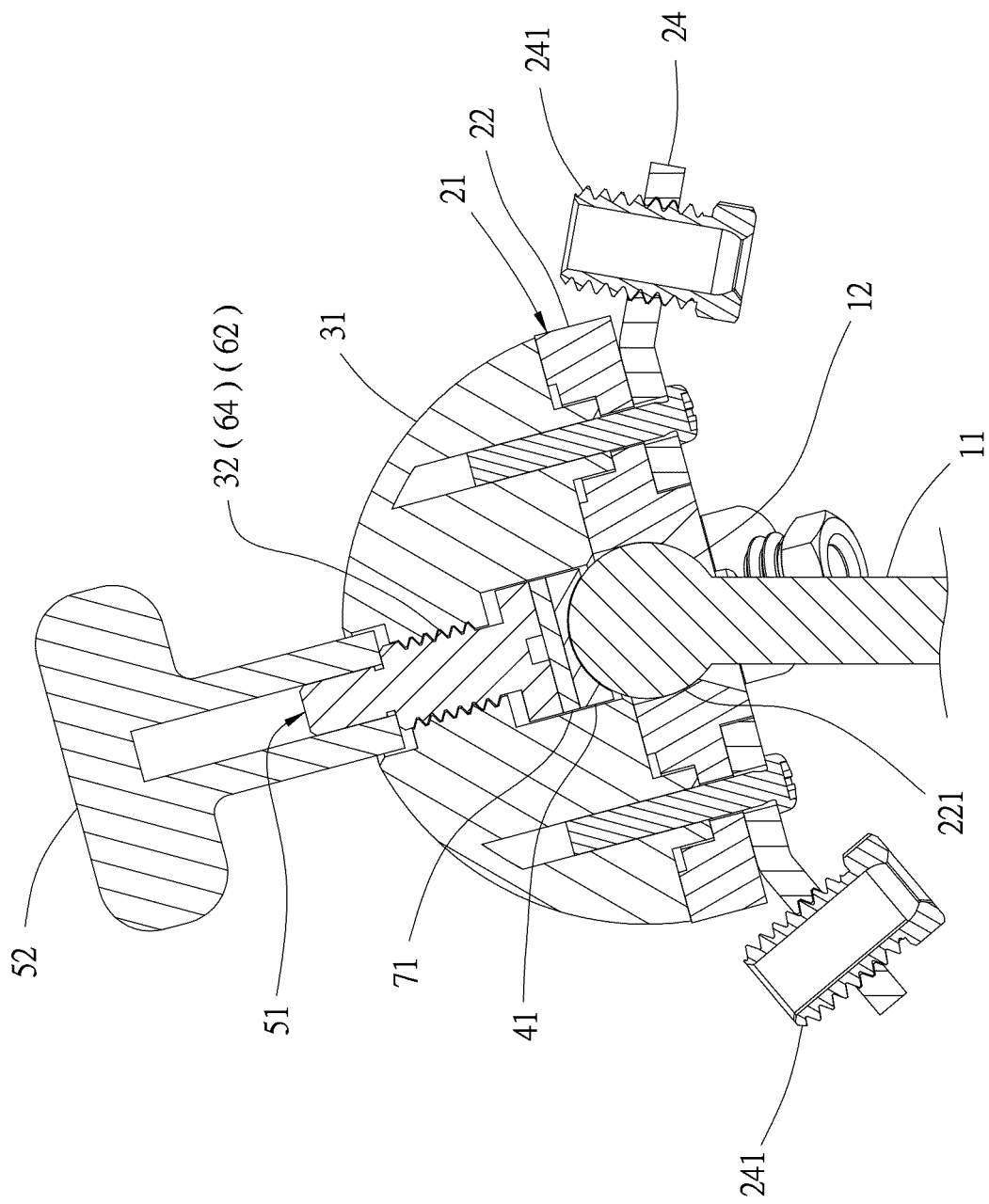
FIG. 5 is a second operational schematic view of the first preferred embodiment of the disclosure.
Figure 6:
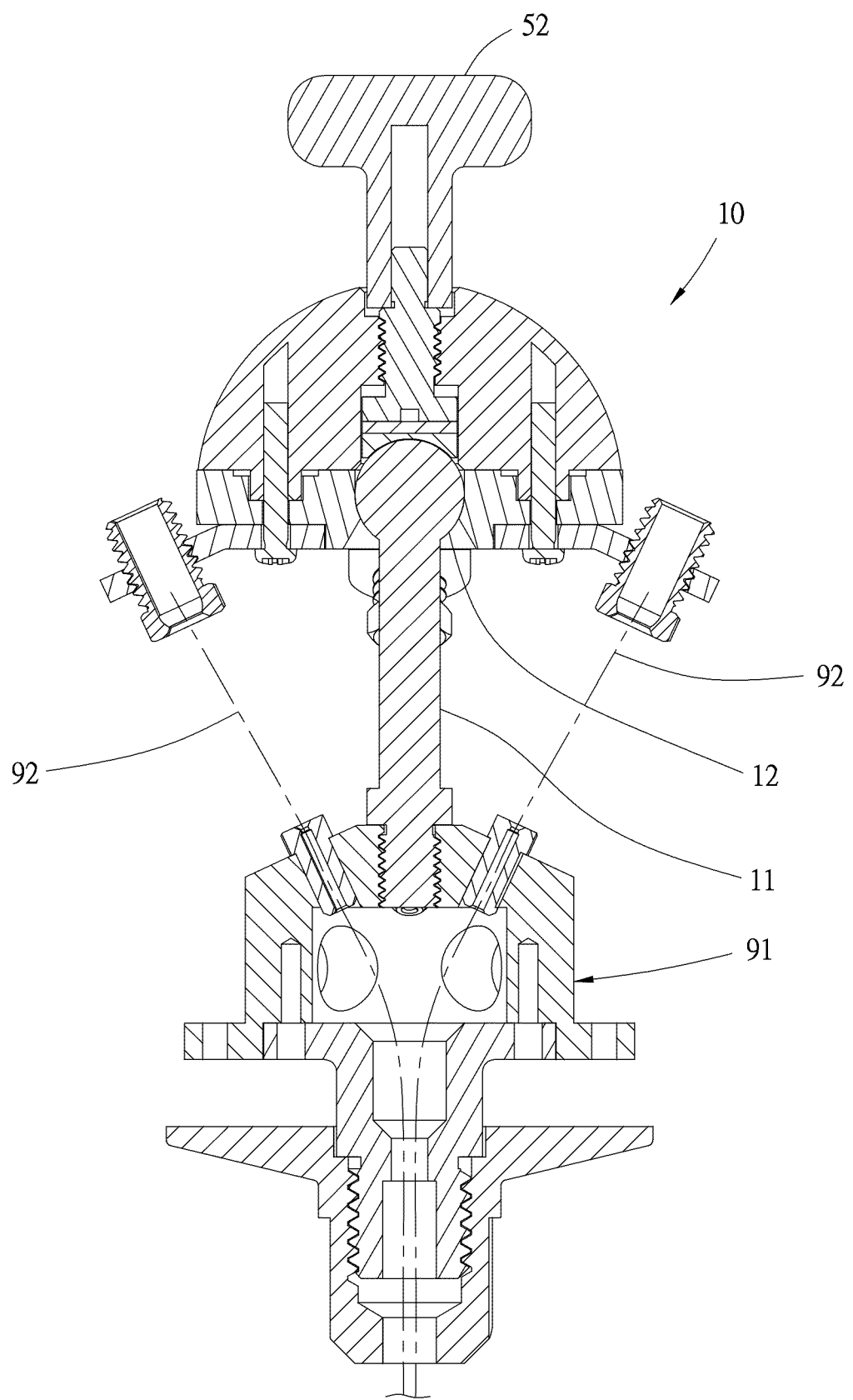
FIG. 6 is an assembled schematic view of the first preferred embodiment of the disclosure.

As shown in FIG. 1 through FIG. 6, a first preferred embodiment of the disclosure provides a damping-enabled endoscope operator 10 intended to be disposed on an endoscope unit 91 (shown in FIG. 6). The damping-enabled endoscope operator 10 essentially comprises a bottom rod 11, a plate 21, a body 31, a damper 41 and an operating rod 51.

The bottom rod 11 is fixedly disposed at the endoscope unit 91. The top end of the bottom rod 11 has a sphere 12. In practice, the sphere 12 and the bottom rod 11 are integrally formed and made of metal. The endoscope unit 91 can be part of an endoscope proper. However, the sphere 12 and the bottom rod 11 are not necessarily integrally formed but are coupled together as needed.

The plate 21 has a penetrating hole 221 penetrable by the bottom rod 11. The penetrating hole 221 is of a small diameter than the sphere 12. In the first preferred embodiment, the plate 21 comprises a bottom element 22 and a plate element 24 fixedly coupled together, with the penetrating hole 221 disposed at the bottom element 22, whereas the plate element 24 has a plurality of cable holders 241 and is made of metal for exemplary purposes.

The body 31 is fixedly disposed at the plate 21 and adapted to cover the sphere 12 to rotatably clamp the sphere 12 between the plate 21 and the body 31. The body 31 has an installation channel 32 penetrating the body 31 vertically. The bottom end of the installation channel 32 is of a smaller diameter than the sphere 12. A portion of the sphere 12 protrudes into the installation channel 32.

The damper 41 is disposed in the installation channel 32. The bottom of the damper 41 abuts against the sphere 12. In practice, the bottom of the damper 41 is flat. However, in the first preferred embodiment, the bottom of the damper 41 is concave down such that the bottom of the damper 41 is in tight contact with the sphere 12, i.e., has a greater contact area with the sphere 12, to provide greater damping.

The operating rod 51 is movably vertically disposed at the body 31. A portion of the operating rod 51 protrudes into the installation channel 32. The bottom end of the operating rod 51 is adapted to press against or separate from the damper 41 during the vertical movement of the operating rod 51. In practice, the operating rod 51 has a hand-gripping component 52 that can be conveniently gripped by hand to facilitate operation.

A positioning mechanism 61 is disposed between the operating rod 51 and the body 31 and adapted to enable the operating rod 51 to be positioned in place upon completion of the vertical movement of the operating rod 51. In the first preferred embodiment, the positioning mechanism 61 comprises a thread 62 disposed at the operating rod 51 and a thread 64 disposed on the inner wall of the installation channel 32 of the body 31, allowing the operating rod 51 to be fastened to the body 31. The operating rod 51 can be rotated and thus moved vertically relative to the body 31, allowing the operating rod 51 to be positioned in place through the thread meshing.

The plurality of cable holders 241 are equiangularly spaced apart from one another relative to the installation channel 32 and each adapted to fix one cable 92 for insertion into the endoscope unit 91. In practice, the cables 92 are connected to a head (not shown) at the front end of the endoscope, and the direction of the swing of the head is controlled with the operating rod 51. The endoscope head is a widely known component of a conventional endoscope and thus is, for the sake of brevity, not shown in the diagram.

In the first preferred embodiment, a buffer pad 71 is disposed at the bottom of the operating rod 51 and adapted to abut against the damper 41 while the operating rod 51 is descending. The buffer pad 71 is made of a resilient material capable of providing a restoring force after deformation, such as rubber. When the buffer pad 71 abuts against the damper 41, the buffer pad 71 deforms and spreads pressure to allow the damper 41 to uniformly press against the sphere 12 to attain enhanced damping.

The structural features of the damping-enabled endoscope operator 10 in the first preferred embodiment are described above. The operation of the damping-enabled endoscope operator 10 in the first preferred embodiment is described below.

Figure 1:
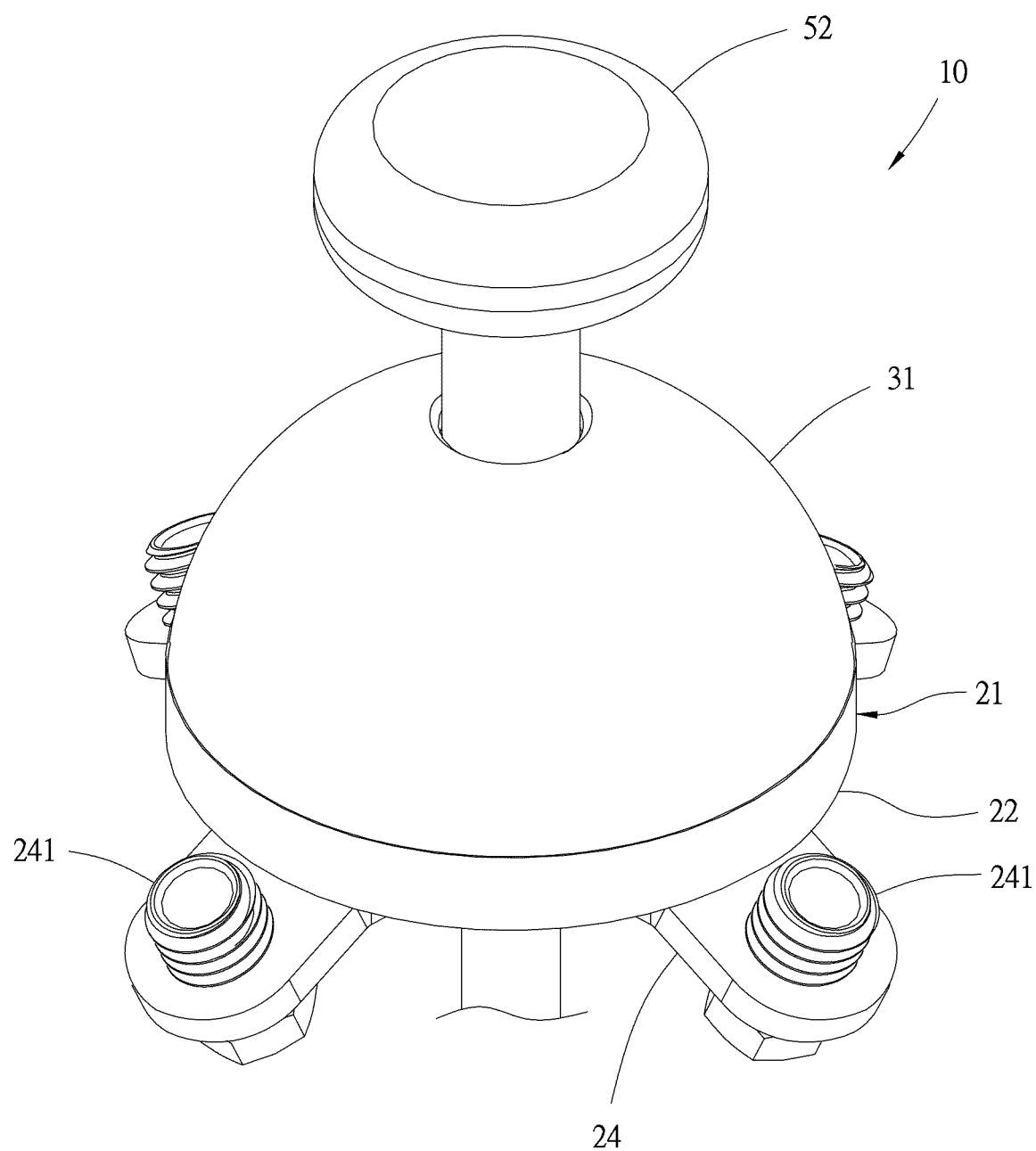
FIG. 1 is a perspective view of the first preferred embodiment of the disclosure.
Figure 2:
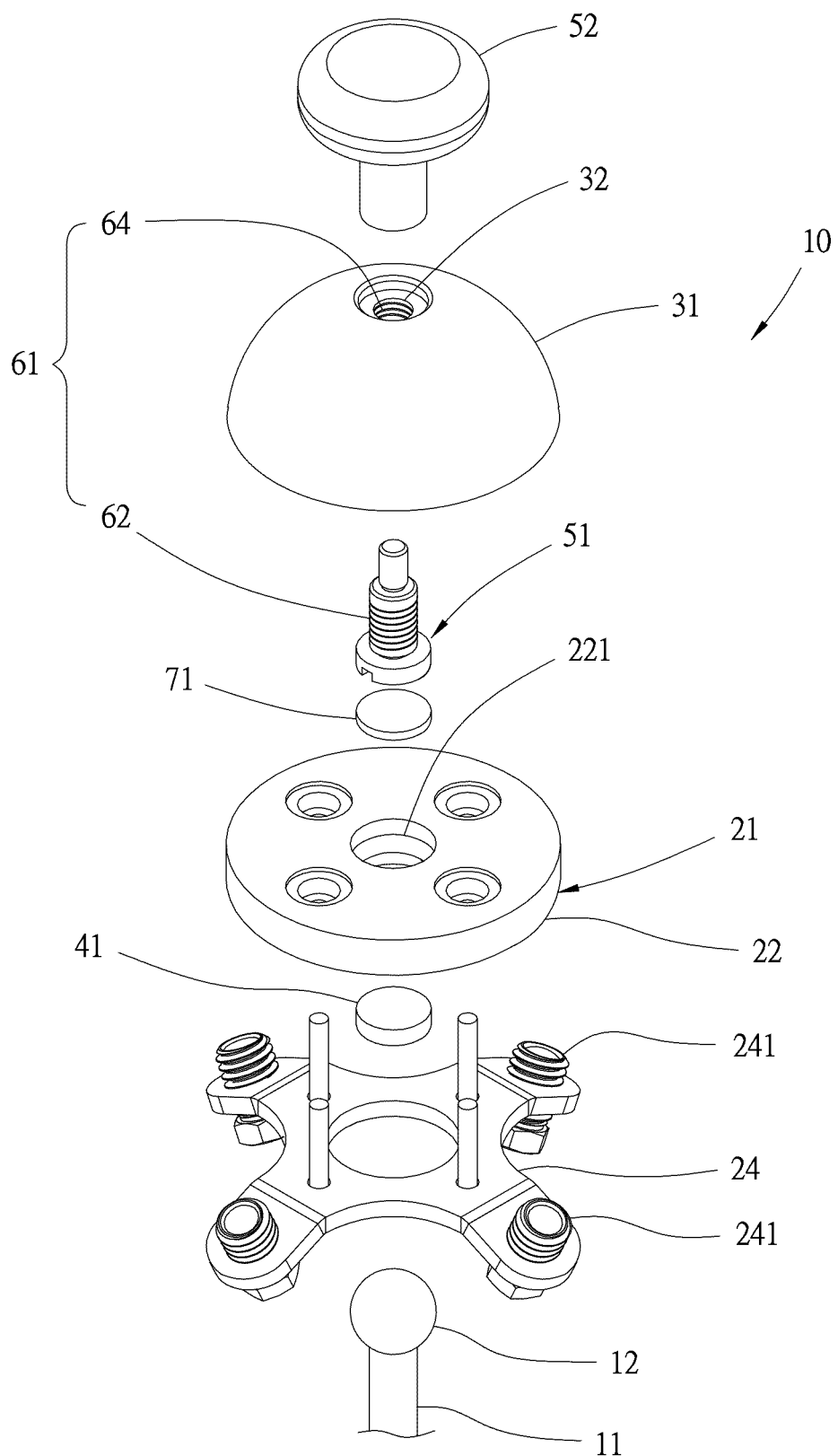
FIG. 2 is an exploded view of the first preferred embodiment of the disclosure.
Figure 3:
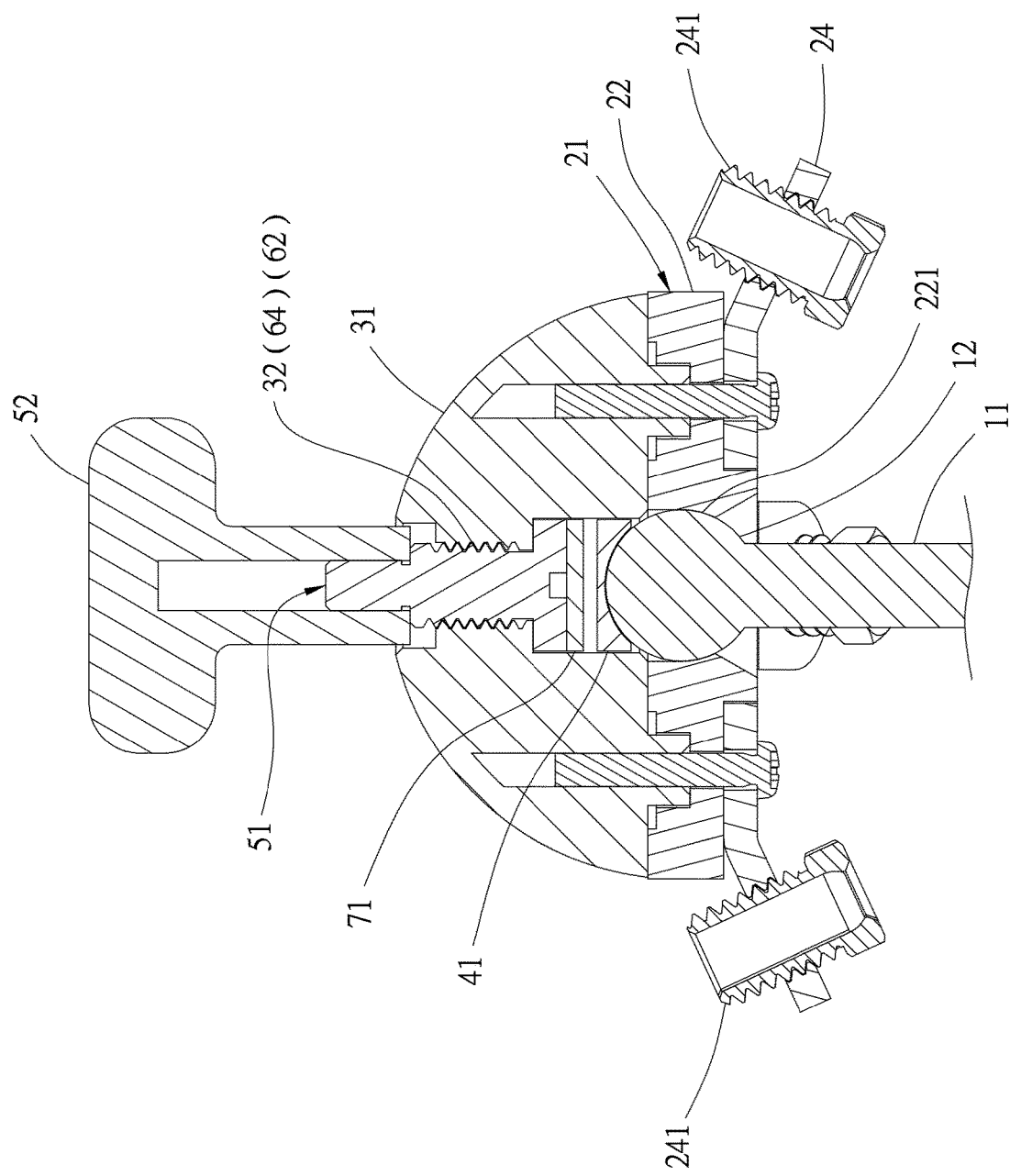
FIG. 3 is a cross-sectional view the first preferred embodiment of the disclosure.

As shown in FIG. 3, the damping-enabled endoscope operator 10 enters a damping-disabled state as soon as the bottom of the operating rod 51 and the buffer pad 71 separate from the damper 41. At this point in time, the user can grip the hand-gripping component 52 to control the operating rod 51 and thus change the angle of the operating rod 51 relative to the sphere 12, as shown in FIG. 4, to pull or release the cables 92 and thereby alter the swing angle of the endoscope head (not shown).

As shown in FIG. 5, when the user has swung the endoscope head to a required angle or a target position, the user may rotate the operating rod 51 with the hand-gripping component 52. Owing to the thread meshing, the rotation of the operating rod 51 causes the operating rod 51 to descend unless the buffer pad 71 abuts against the damper 41 tightly.

At this point in time, the sphere 12 is not only restrained by the damper 41 but also tightly restrained by the plate 21 and the body 31, and in consequence the damper 41 can act on the sphere 12 and thus provide resistance, allowing the operating rod 51, the body 31 and the plate 21 to collectively press against the sphere 12 to provide damping, i.e., achieve a damping-enabled state. In this state, the plurality of cables 92 do not have sufficient tension to overcome the damping and thus cannot stretch or shorten relative to the endoscope unit 91; as a result, the endoscope head cannot swing again but stays at its current angle. However, if the user manipulates the operating rod 51 by hand under an applied force great enough to overcome the damping, the operating rod 51 can swing and alter its swing angle. After the user has stopped exerting the applied force, the operating rod 51 stays at the position because of the damping. Therefore, the damping-enabled state is conducive to delicate operation of the operating rod 51 and thereby precise control.

As revealed above, the damper 41 acts directly on the sphere 12 such that the body 31 and the plate 21 press against the sphere 12 in the damping-enabled state to achieve damping and thus directly perform damping on the operating rod 51 to require it to overcome the damping under an applied force, and the operating rod 51 does not exhibit instability, such as shaking, in the damping-enabled state.

FIG. 6 shows the state in which the damping-enabled endoscope operator 10 is mounted on the endoscope unit 91 in the first preferred embodiment. As shown in FIG. 6, two cables 92 (indicated by the imaginary lines) extend and enter the endoscope unit 91.

In addition to the plate 21, the plurality of cable holders 241 can be disposed at the body 31 and equiangularly spaced apart from one another to fix the cables 92 in place. Thus, the plurality of cable holders 241 are not necessarily disposed at the plate 21.

Figure 7:
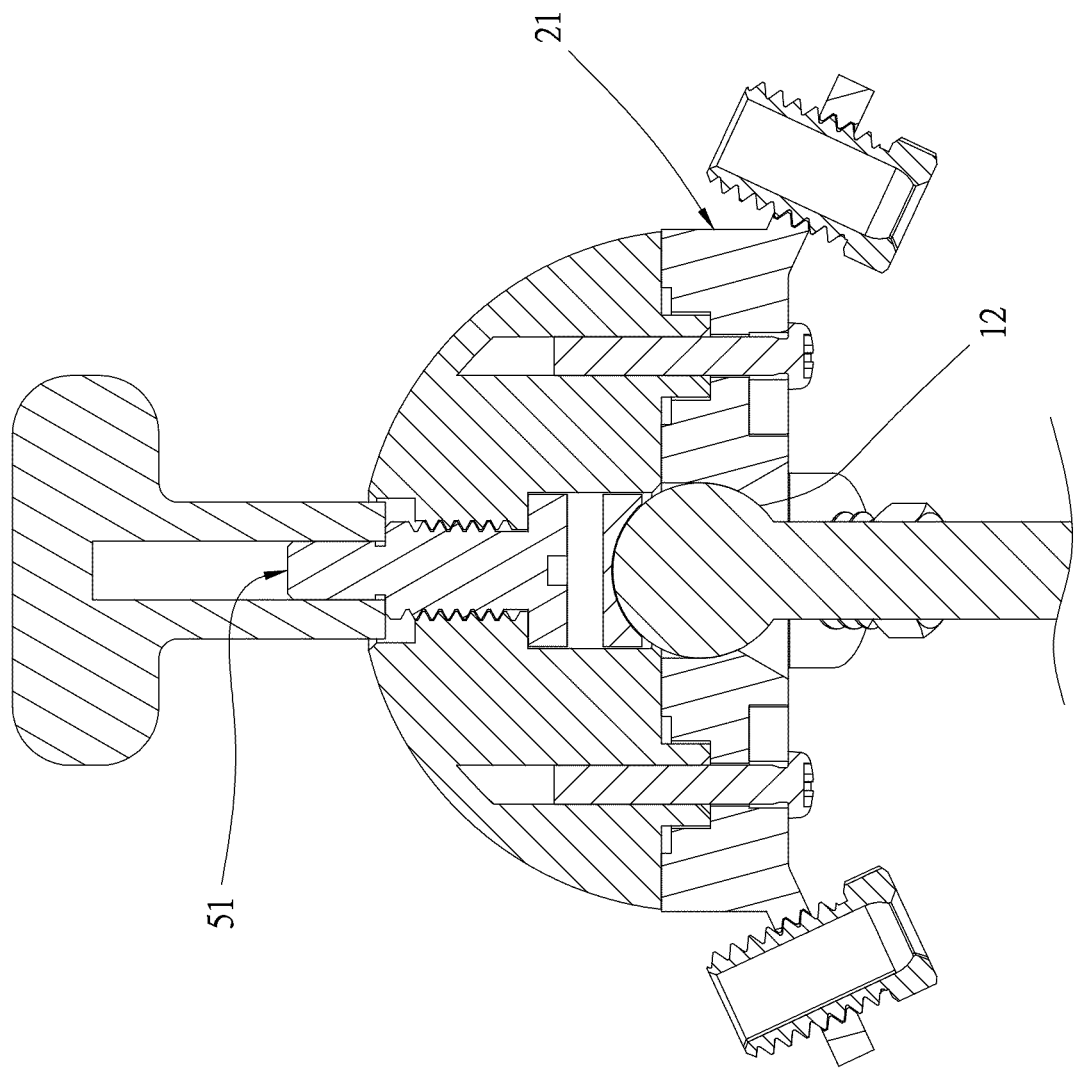
FIG. 7 is a cross-sectional view the first preferred embodiment of the disclosure, omitting some components.

As shown in FIG. 7, the plate 21 is one integrally formed instead of comprising the bottom element 22 and the plate element 24. Referring to FIG. 7, the buffer pad 71 is absent, and the bottom of the operating rod 51 abuts against the damper 41 to provide damping to the sphere 12; however, the damping effect thus achieved is weaker because of the absence of buffering and deformation effect otherwise provided by the buffer pad 71.

Figure 8:
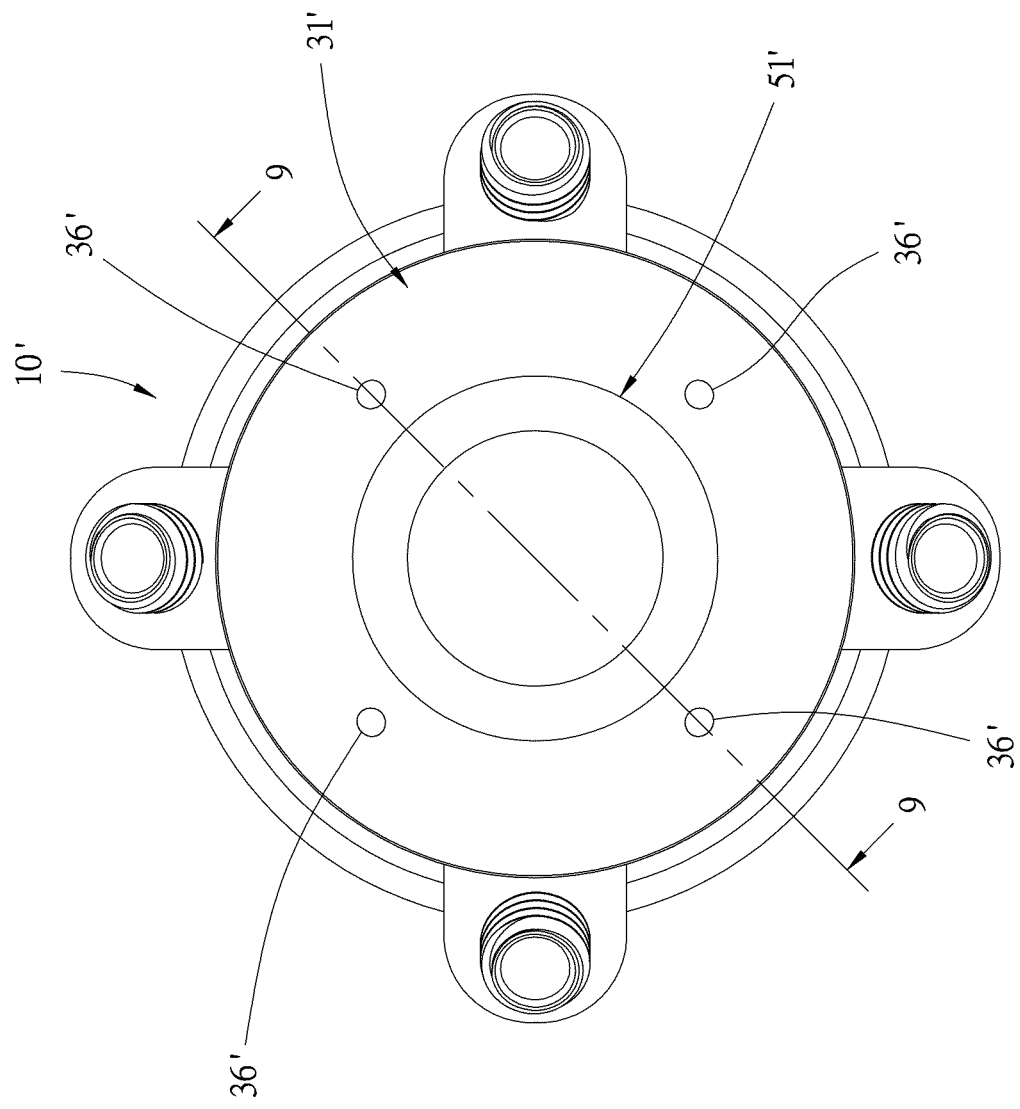
FIG. 8 is a top view of the second preferred embodiment of the disclosure.
Figure 9:
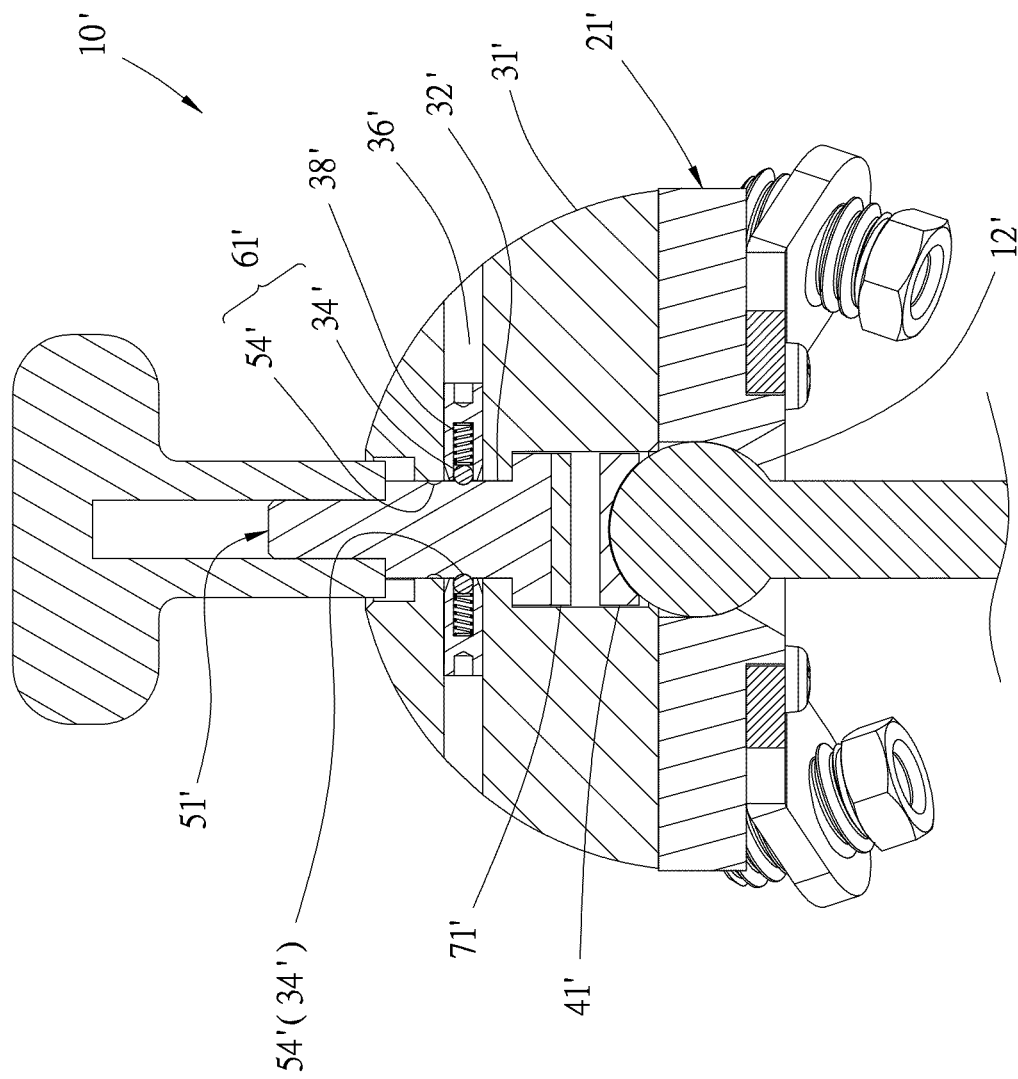
FIG. 9 is a cross-sectional view taken along line 9-9 of FIG. 8.
Figure 10:
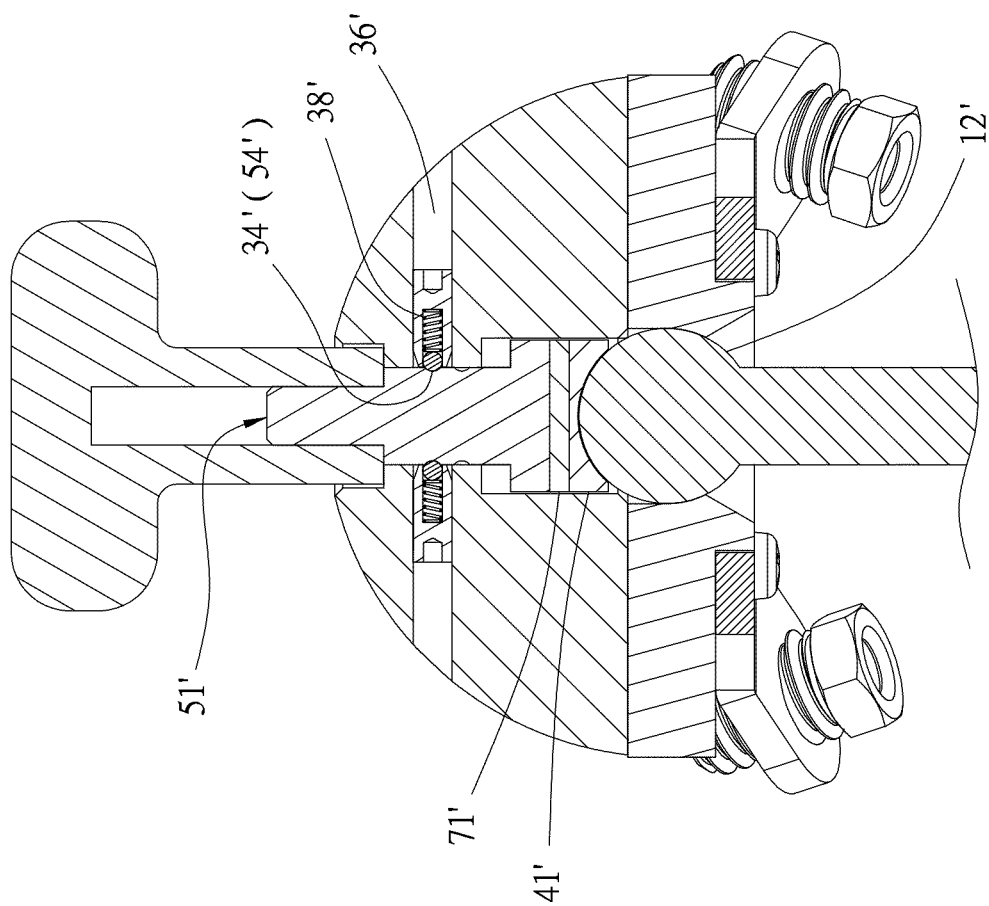
FIG. 10 is an operational schematic view of the second preferred embodiment of the disclosure.

As shown in FIG. 8 through FIG. 10, a damping-enabled endoscope operator 10' provided by a second preferred embodiment of the disclosure is distinguished from the damping-enabled endoscope operator 10 in the first preferred embodiment of the disclosure by technical features described below.

The positioning mechanism 61' in the second preferred embodiment is not based on the thread-meshing relationship in the first preferred embodiment but comprises two circumferential grooves 54', on top of each other, disposed at the operating rod 51' and a plurality of positioning balls 34' disposed at the body 31'. The body 31' has a plurality of slots 36'. The plurality of slots 36' are in communication with the installation channel 32'. The positioning balls 34' are disposed in the slots 36' respectively. The slots 36' each have therein a resilient element 38', such as a spring. The resilient elements 38' generate a resilient restoring force under which the positioning balls 34' are pushed toward the installation channel 32' and thus snap-fitted to one of the two circumferential grooves 54'.

As shown in FIG. 9, in the damping-disabled state, the operating rod 51' is at the elevated position, and the lower one of the two circumferential grooves 54' is aligned with the plurality of slots 36'. Thus, the plurality of positioning balls 34' are pushed by the resilient elements 38' in the plurality of slots 36' and thus snap-fitted to the lower circumferential groove 54', allowing the operating rod 51' to be positioned in place. At this point in time, the buffer pad 71' does not press against the damper 41' and thus does not act on the sphere 12', and thus no damping occurs, allowing the operating rod 51', the body 31', and the plate 21' to freely adjust their angles relative to the sphere 12', i.e., adjust the swing angle of the endoscope head (not shown).

As shown in FIG. 10, to rotate the operating rod 51' and thus cause the endoscope head to swing to reach a required position, the user manipulates the operating rod 51' to cause the operating rod 51' to descend and thus cause the plurality of positioning balls 34' to exit the lower circumferential groove 54', so as to allow the plurality of positioning balls 34' to be pushed and snap-fitted into the upper circumferential groove 54' under a resilience force exerted by the plurality of resilient element 38' as soon as the upper circumferential groove 54' descends and gets aligned with the plurality of positioning balls 34', allowing the operating rod 51' to be positioned in place. At this point in time, the buffer pad 71' below the operating rod 51' presses against the damper 41', and thus the damper 41' presses against the sphere 12' to achieve damping and attain the damping-enabled state.

It is noteworthy that the plurality of slots 36' are not necessarily in a plural number; instead, one slot 36' operates in conjunction with one positioning ball 34' and one resilient element 38' to achieve the positioning effect. In this regard, the plurality of slots 36' achieve a better positioning effect than one slot 36'. The circumferential grooves 54' are not necessarily in the number of two. If the operation of the damping-enabled endoscope operator 10' involves only two states, namely the damping-disabled state and the damping-enabled state, the circumferential grooves 54' in the number of two are enough. However, a third circumferential groove 54' is required for any other states, for example, states that differ in terms of damping strength. Therefore, the circumferential grooves 54' are not necessarily in the number of two.

The other structural features and achievable advantages of the damping-enabled endoscope operator 10' in the second preferred embodiment of the disclosure are substantially the same as those of the damping-enabled endoscope operator 10 in the first preferred embodiment of the disclosure and thus are, for the sake of brevity, not reiterated.

Although the disclosure is disclosed above by preferred embodiments, the preferred embodiments are not restrictive of the claims of the disclosure. Simple changes and equivalent implementation made by persons skilled in the art to the preferred embodiments in accordance with the claims and specification of the disclosure shall be deemed falling within the scope of the claims of the disclosure.

What is claimed is:

1. A damping-enabled endoscope operator, adapted to be disposed on an endoscope unit, the damping-enabled endoscope operator comprising:
    a bottom rod fixedly disposed at the endoscope unit and having a top end provided with a sphere;
    a plate having a penetrating hole penetrable by the bottom rod, with the penetrating hole being of a small diameter than the sphere;
    a body fixedly disposed at the plate and adapted to cover the sphere to rotatably clamp the sphere between the plate and the body, the body having an installation channel penetrating the body vertically, wherein a bottom end of the installation channel is of a smaller diameter than the sphere, and a portion of the sphere protrudes into the installation channel;
    a damper disposed in the installation channel and having a bottom abutting against the sphere; and
    an operating rod movably vertically disposed at the body, partially protruding into the installation channel, and having a bottom end adapted to press against or separate from the damper during the vertical movement of the operating rod,
    wherein a positioning mechanism is disposed between the operating rod and the body and adapted to enable the operating rod to be positioned in place upon completion of the vertical movement thereof,
    wherein one of the body and the plate has a plurality of cable holders equiangularly spaced apart from one another relative to the installation channel and adapted to fix cables in place for insertion into the endoscope unit.

2. The damping-enabled endoscope operator of claim 1, further comprising a buffer pad disposed at a bottom of the operating rod and adapted to abut against the damper while the operating rod is moving downward.

3. The damping-enabled endoscope operator of claim 2, wherein the buffer pad is made of rubber.

4. The damping-enabled endoscope operator of claim 1, wherein the plate comprises a bottom element and a plate element fixedly coupled together, with the penetrating hole disposed in the bottom element, and the plurality of cable holders disposed at the plate element.

5. The damping-enabled endoscope operator of claim 4, wherein the plate element is made of metal.

6. The damping-enabled endoscope operator of claim 1, wherein a hand-gripping component is disposed at a top end of the operating rod.

7. The damping-enabled endoscope operator of claim 1, wherein the positioning mechanism comprises a thread disposed at the operating rod and a thread disposed at the body and thus is located inside the installation channel, allowing the operating rod to be fastened to the body.

8. The damping-enabled endoscope operator of claim 1, wherein the positioning mechanism comprises at least two circumferential grooves, on top of each other, disposed at the operating rod and at least a positioning ball disposed at the body, the body having at least a slot in communication with the installation channel, the at least a positioning ball being disposed in the at least a slot, the at least a slot having therein a resilient element, so as for the at least a positioning ball to be pushed toward the installation channel under a resilient restoring force of the resilient element and thus snap-fitted to one of the at least two circumferential grooves.

9. The damping-enabled endoscope operator of claim 1, wherein a bottom of the damper is concave down.

* * * * *